Oct. 16, 1956            D. WESTON            2,766,939

AUTOMATIC CONTROL CASE

Filed April 15, 1952                                7 Sheets-Sheet 7

INVENTOR
DAVID WESTON
By- Fetherstonhaugh
ATTORNEYS

United States Patent Office 2,766,939
Patented Oct. 16, 1956

2,766,939
AUTOMATIC CONTROL CASE

David Weston, West Toronto, Ontario, Canada

Application April 15, 1952, Serial No. 282,505

34 Claims. (Cl. 241—19)

This invention relates to a method and apparatus for controlling the rate of feed of material to material reduction mills. This is a continuation in part of my application Serial No. 259,060, filed November 30, 1951, and now abandoned.

It is common knowledge in the material reduction art that for any given set of conditions (i. e. type of mill, hardness of material, size range of feed material, etc.) there is an optimum rate of feed to the mill which will result in the mill operating at a maximum efficiency, that is to say which will produce the maximum quantity of product with the minimum consumption of power. This optimum rate of feed is such that it maintains a volume of charge within the mill which bears a particular relationship to the total volume of the mill drum. It is a well known phenomenon both in ball mills and tube mills as well as in reduction mills which utilize the material itself as a reduction medium that efficiency declines whenever the volume of charge in the mill varies from such optimum value.

Various proposals have been made from time to time for automatically controlling feed of such mills for the purpose of maintaining conditions of optimum efficiency, but to date no entirely satisfactory method has been found. It has been noted, for instance, that the sound produced by a mill varies as the volume of the charge varies, and in many cases a skilled operator can determine by listening to a mill whether the mill is operating at optimum efficiency. One object of the present invention is to convert the sound given off into an electric signal and controlling the feed in accordance with this signal by adapting for this purpose means now available on the market. It has been proposed to utilize for the same purpose signals produced by vibration, or by the amount of power consumed by the mill.

One objection to previously suggested arrangements has been that correction was started after conditions of inefficient operation had existed for more or less prolonged periods, producing hunting from conditions of overload to conditions of underload. There is, however, a second important factor militating against successful uses of these prior proposals; the relationships between power consumption and efficiency, and generation of noise or vibration and efficiency, vary in opposite directions on either side of the point of maximum efficiency, whereby the signal produced by power consumption, noise or vibration, cannot be related to a datum figure and caused to exert a corrective influence on the feed in accordance with the result, unless a datum figure corresponding to some other point than that of maximum efficency is used. This is so because one cannot determine whether a change in the level of vibration, noise or power consumption is due to over- or under-loading. Thus, a severe limitation is imposed on such control devices in that they cannot use optimum conditions as a datum.

It is the principal object of the present invention to provide a method and apparatus which will overcome the above-mentioned disabilities of prior suggestions and which will automatically maintain the conditions of operation of the material reduction mill at optimum efficiency.

Other objects and advantages of the invention will become apparent as the specification proceeds.

Broadly speaking, optimum conditions within a mill are maintained according to the invention by the continuous production of an electric signal which is inversely functional to, that is which varies inversely with, the rate of production of the mill; continuous production of a similar electric signal functional to, that is which varies with, power input to the mill; summation of these two signals and comparison of the sum to a datum corresponding to the sum of said signals determined empirically for optimum efficiency of the mill under given conditions, to produce a difference signal; and variation of the rate of supply of feed material to the mill in accordance with the sense and magnitude of the difference signal.

If the mill is of the air swept type, in which product is withdrawn in finely divided form in a current of air, various devices may be mounted in the air circuit through which the product is delivered from the mill for determining the quantity of product being so delivered. A light source may for this purpose be mounted on one side of a flue forming part of the circuit and a photo-electric cell on the other side to produce a signal which is inversely proportional to the amount of material being carried through the flue.

In accordance with one feature of the invention, said signal may be obtained from the noise or vibration produced within the drum of the mill. This may be accomplished by selecting a particular frequency of noise or vibration the intensity of which does not reach a maximum within the range of conditions corresponding to maximum efficiency of the mill.

It is preferable, according to the invention, that the signal utilized vary substantially linearly with respect to the rate of production of the mill, but this is not essential since any functional variation which is not subject to sense reversal within the range of operation of the control device will permit successful operation of the device.

The production of a signal functional to power input to the mill is comparatively simple and various means for accomplishing this have already been described in the art. Generally speaking, it will be preferred to produce said signal by placing a current transformer in one of the power leads to the mill motor in which case, of course, it is necessary to insure that the power supply to the motor be suitably balanced and regulated.

The invention may be used to particular advantage in connection with air swept mills, and in particular air swept mills of the type described in my United States Patent No. 2,555,171 and in my copending application Serial No. 175,353, filed July 22, 1950, now abandoned in favor of copending application Serial No. 315,470 (Patent No. 2,704,636). In one embodiment of my invention for use in mills of the above type, I derive the electric signal which is substantially inversely functional to the rate of production of the mill by means of a photo-electric arrangement mounted across the flue in the air circuit between the product collector and the mill, the said signal being a D. C. voltage. In this case, the signal functional to power input will be produced by rectifying the voltage obtained by placing a current transformer in one of the power leads to the mill motor.

In accordance with a second embodiment, a sound level signal is employed in the place of the light intensity signal of the first embodiment. The signal indicates the size of the charge in the mill, and it is loudest at low mill loads.

One distinguishing feature of the second embodiment are means, e. g. adjustable rheostats for biasing the output signal of the sound level indicator so that whereas an increase in the sound level will provide for a small increase in the rate of feed, a decrease in the sound level will call for a much greater decrease in the rate of feed. Should the charge in the mill rise beyond that required for optimum efficiency the charge must be reduced to the right size for optimum efficiency. However, while this reduction takes place, the feed to the mill should be less than is necessary to maintain the charge at the increased size at which its capacity to grind up the feed has been materially reduced. On the other hand, a reduced charge in a mill, caused by increased rate of production, does not have the same capacity for grinding up the feed material as the larger charge. This will compensate for the discrepancy between the volume of feed and the rate of production, so that a relatively small increase in feed is all that is required to build the charge up to the starting point. In other words, it is much easier to increase the size of the charge than it is to decrease it. In the first embodiment a conventional smoke-density indicator was employed as a source of the light signal. Therefore, it was necessary to apply a bucking voltage to the output of the indicator in order to apply across a Wheatstone bridge a signal which was substantially inversely functional to a rate of production. In the second embodiment the sound level signal is applied directly to the bridge since it varies substantially inversely as the rate of production, whereby the elements necessary to apply the bucking voltage may be eliminated.

The invention will be further described with reference to the accompanying drawings which illustrate two embodiments and in which.

*First embodiment*

Figure 1:
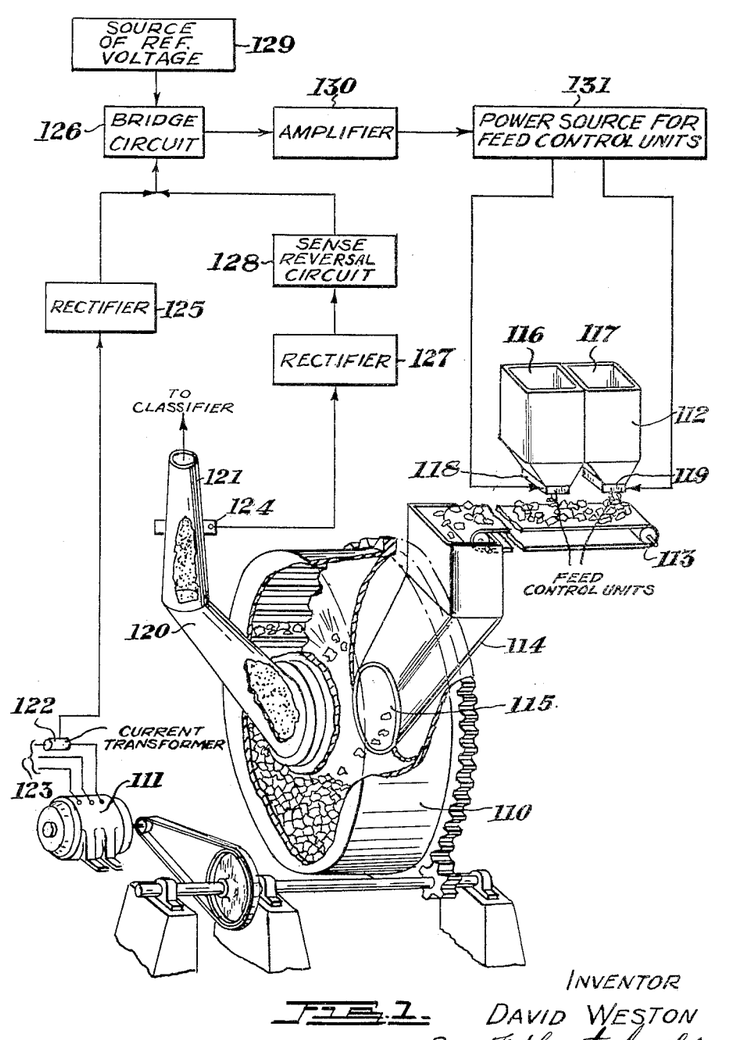
Fig. 1 is a perspective view of a material reduction mill diagrammatically illustrated with electrical control apparatus according to one embodiment of the invention shown in block form.

In Figure 1 a material reduction mill 110 of the air swept type is arranged to be driven by a motor 111 through a conventional belt and gear drive arrangement. The mill 110 is fed from a feed bin 112 by a belt type conveyor 113 and a chute 114 which is arranged to conduct material from the conveyor 113 to the axial input opening 115 of the mill 110. The feed bin 112 is divided into two compartments 116 and 117 which contain, respectively, coarse particles of material and fine particles. Feed control units 118 and 119 of the well known electrical vibrator type are arranged to control the rate of feed of material from the compartments 116 and 117. The product of the mill which is of a selected particle size is removed by an air stream through a classifying arrangement consisting of a sloping conduit 120 and a vertical conduit 121 preferably arranged in accordance with the teachings of my copending application Ser. No. 241,807, filed August 14, 1951 (now Patent No. 2,696,908), to return oversize material to the mill drum for further reduction. This general arrangement of a mill and its operation is described in my U. S. Patent No. 2,555,171 of May 29, 1951.

An electrical signal proportional to the power input of the mill is obtained from a current transformer 122 connected in one of the power lines 123 of the three-phase induction motor 111. This signal will be substantially proportional to the total power input if the motor is a balanced one in which the power is substantially equally divided between each of the three-phase power lines 123.

An electrical signal substantially proportional to the rate of production of the mill 110 is obtained by photoelectric apparatus 124 which is arranged to view the density of the finely divided product of the mill 110 as it is carried through the vertical conduit 121. The photoelectric apparatus may be of the conventional type in which a light beam is directed toward a photoelectric cell and, in this case, the light beam is directed across the conduit 121. The photo-electric cell may be of the type which produces an output inversely proportional to the amount of light striking the photoelectric cell in the photoelectric apparatus 124.

The power input signal from the current transformer 122 and the production signal from the photoelectric apparatus are rectified respectively, by rectifiers 125 and 127, and after the sense of the production signal is reversed by a sense reversal circuit 128, the two signals are summed and the resultant signal is fed to the bridge circuit 126. A reference voltage, corresponding to the sum of the power input signal and the production signal for optimum efficiency of the mill, is supplied from a source 129 to the bridge circuit 126 where it is compared to the sum of the power input signal and the production signal and the difference signal so produced is supplied to the input of an amplifier 130. The output of the amplifier 130 connects to the control circuits of a power source 131 for the feed control units 118 and 119, and this circuit is so arranged that the power supplied to the feed control units 118 and 119, and consequently the rate of feed of ore to the conveyor 113, is controlled by the amplified difference signal from the bridge circuit 126.

In operation the rate of feed of material from the bin 112 to the conveyor 113 is continuously controlled so as to obtain the operating conditions which correspond to optimum efficiency of the mill 110. Assuming the mill to be operating at optimum efficiency, an increase in the power supplied to the motor 111 tends to reduce the rate of feed of material to the mill 110, whereas a decrease in the rate of production of the mill 110 tends to decrease the rate of feed of material to the mill 110. It will be readily observed that under these circumstances most efficient operating conditions within the mill 110 will be maintained indefinitely.

The detailed circuits for the operation of the various units shown in block form in Figure 1 will now be described with reference to the schematic diagram shown in Figure 2.

The output of the photoelectric apparatus 124 is fed through a transformer T201 and a rectifying tube V201 (127, Fig. 1) so that it appears as a D. C. voltage across a condenser C201. For example, the D. C. voltage across the condenser may be 35 volts for the maximum desired rate of production of the mill 110. A potentiometer R201 is connected in parallel with the condenser C201 and the variable tap of the potentiometer R201 is connected to the control grid of a triode type vacuum tube V202. The positive end of the potentiometer R201 is connected to a source of bucking voltage derived from a potentiometer R202 so that the voltage appearing at the control grid of the tube V202 is opposite in sense to the voltage appearing across the condenser C201. The anode of the tube V202 connects to an anode supply line 235 which is supplied with a regulated voltage of approximately +105 volts. The cathode of the tube V202 connects through the cathode load resistor R203 to the zero voltage line 236, and it is across the resistor R203 that the production signal appears and from which (128, Fig. 1) it is supplied to the bridge circuit.

The current transformer 122 is connected to the primary winding of a transformer T202, and the current in the secondary winding of the transformer T202 produces a voltage across the parallel-connected resistor R204. A portion of this voltage is applied by a potentiometer R205 to a condenser C202 through a rectifier D201 (125, Fig. 1). A resistor R206 is connected to limit the minimum setting of the potentiometer R205. The potentiometer R205 can be adjusted so that the maximum average permissible current to be drawn by the mill motor 111 will develop a D. C. voltage of 100 volts across the condenser C202. The resistor R203 and the condenser C202 are series connected to form one arm of a bridge circuit (126, Fig. 1) of which the other arms are formed by a resistor R207 series connected with a potentiometer R208; a resistor R209 and a resistor R210. The series connected resistor R207 and potentiometer R208 which form one arm of the bridge circuit are series connected through a resistor R211 to a voltage supply line 237 which is supplied with a voltage of −150 volts from a regulated source. The resistors R207 and R211 limit the range of settings of the potentiometer R208 so that the voltage appearing at the connection to its variable tap can be varied from approximately −50 volts to −125 volts. The output voltage of the bridge circuit appears between the junction of the resistors R209 and R210 and the zero voltage line 236. For resistors R209 and R210 of equal value, the output voltage of the bridge circuit is equal to one-half of the difference between the reference voltage obtained via conductors 236, 237 from the D. C. source (corresponding to 129 of Fig. 1) and applied to the bridge circuit at the junction of R207 and R208 and, in effect at the junction of R210 and C202, the junction of R203 and R207 being grounded, and the sum of the power input signal voltage and the production signal voltage as they appear respectively across the condenser C202 and the resistor R203 (corresponding to the outputs of 125 and 128 of Fig. 1). When the sum of the power input signal voltage and the production signal voltage equals the reference voltage, the bridge is balanced and there is no output voltage.

The output voltage of the bridge circuit is supplied to the control grid of a triode vacuum tube V203 through a de-sensitizing circuit composed of the resistors R212 and R213 and through a current limiting resistor R214. If desired, resistors of different values can be arranged to be switched into the circuit so that the sensitivity of the control apparatus can be adjusted. The cathode of the tube V203 connects to the variable tap of a potentiometer R215 which is series connected with the potentiometer R202 and a resistor R216 between the zero voltage line 236 and the +105 volts line 235. The potentiometer R215 can be adjusted, for zero output voltage from the bridge circuit, so that the cathode is positive enough to operate the tube in the centre of its operating characteristic. The anode of the tube V203 is connected through an anode load resistor R217 to the +105 volts line 235 and is also connected through series connected resistors R218, R219 and R220 to the control grid of a triode type vacuum tube V204. The junction of the series connected resistors R218 and R219 is connected through a resistor R221 to the −150 volts line 237 so that a voltage is supplied through the resistor R218 which opposes the anode voltage of the tube V203. The junction of the series connected resistors R219 and R220 is connected through a variable resistor R222 series connected with a condenser C203 to the zero voltage line 236. The cathode of the tube V204 is connected through a cathode resistor R223 to the zero voltage line 236 so that some degeneration is supplied in the circuit to improve the stability of the amplifier above described and corresponding to 130 of Fig. 1. The anode of the tube V204 connects to the cathode of a triode type vacuum tube V205 and also connects through a resistor R224, to the variable tap of a potentiometer R225 as well as through a potentiometer R226 and a series connected resistor R227 to the zero voltage line 236. The anode of the tube V205 is connected to a +200 volts line 238 which may be supplied from an unregulated source. The control grid of the tube V205 is connected through a resistor R228 to the variable tap of a potentiometer R229. The potentiometer R229 and series connected resistors R230 and R241 are connected between the zero voltage line 236 and the +105 volts line 235.

The anode voltage of the tube V204 is supplied from the 105 volts line 235 through the potentiometer R225, the D. C. winding of a saturable reactor SR201 and the D. C. winding of a second saturable reactor SR202. The saturable reactors SR201 and SR202, which form part of the input for the feed control units (131, Fig. 1), may be of a conventional design and in the usual manner their A. C. windings are supplied with A. C. from a voltage divider circuit comprising the resistors R231, R232, R233 and R234 connected across an A. C. power line 239 (115 volts).

The phase shifted voltage produced by such saturable reactor which together with the components to be presently described constitute 131 of Fig. 1 in response to the D. C. flowing in its D. C. winding appears across the resistors R235 and R236 and is supplied to the control grids of the thyratron type tubes V206, V207, V208 and V209 through current limiting resistors R237, R238, R239 and R240. Condensers C204, C205, C206 and C207 are connected respectively from the control grids of the tubes V206, V207, V208 and V209 to their cathode connections in order to minimize the effect of power line surges. The cathode connections of the thyratrons are through centre taps of the secondaries of filament transformers T203, T204, T205, T206. The primaries of the filament transformers are not shown as the construction and operation of such filament transformers are well known in the art. The anodes of the thyratrons V206 and V207 are connected to the control circuit of the feed control unit 118 and the anodes of the thyratrons V208 and V209 are connected to the control circuit of the feed control unit 119. The anode voltage for the thyratrons is supplied from a power line 240 (575 volts) through the control circuit of each of the feed control units 118 and 119, the other side of the power line being connected to the centre taps of the secondaries of the filament transformers T203, T204, T205, T206. The power line 240 is of the same phase as the power line 239 and, in accordance with the usual practice, protective equipment (not shown) is supplied to allow the thyratrons V206, V207, V208 and V209 to reach their operating temperatures before anode voltage is applied to them.

Figure 2:
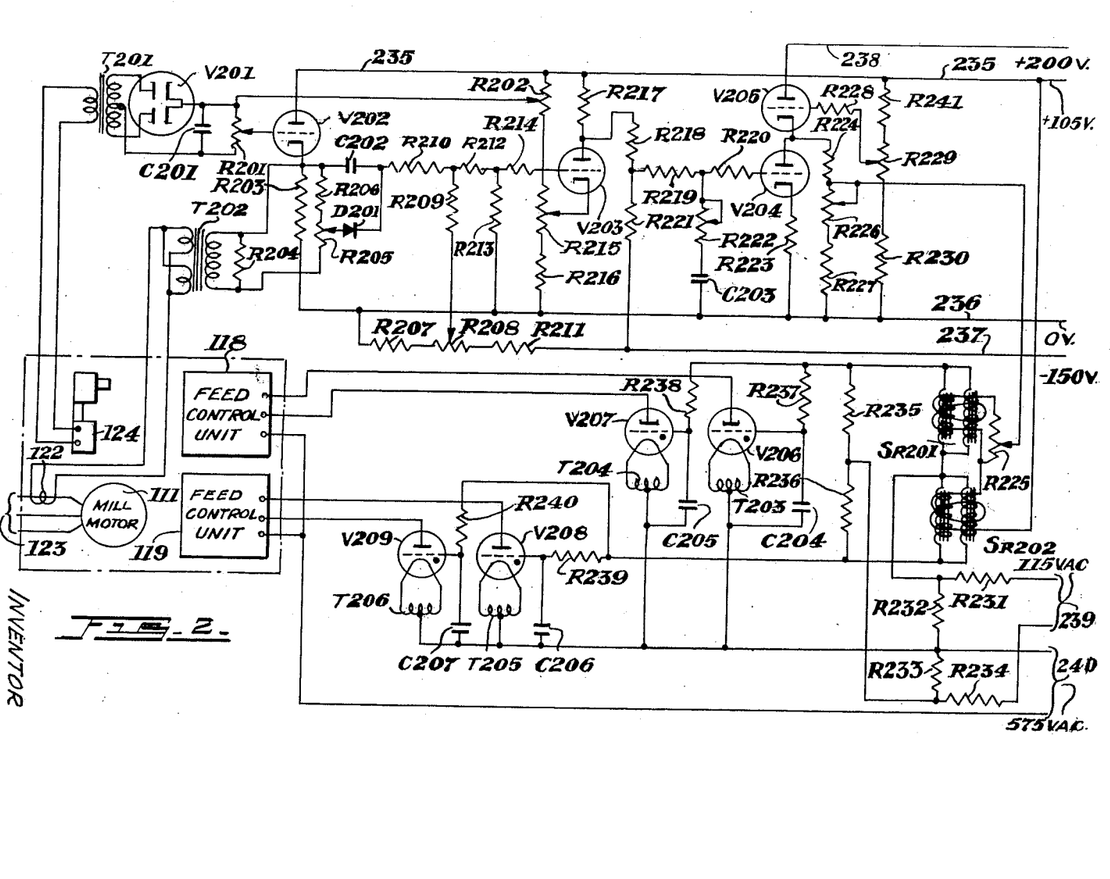
Fig. 2 is a schematic diagram showing the electrical connections between the various components of the apparatus shown in Fig. 1.

The following list contains examples of values for the various components used in the circuit shown in Figure 2.

Tubes:
    V201_______________ Double diode, type 6H6.
    V202 and V205______ Each a section of a double triode, type 6SN7.
    V203 and V204______ Each a section of a double triode, type 6SN7.
    V206, V207, V208 and V209. Each a gaseous triode; thyratron type GL5545.
    Rectifier D201_______ Selenium rectifier.
Condensers:
    C201 and C202______ 4. 75 mfd.
    C203_______________ 12. 0 mfd.
    C204, 205, 206, 207___ 0. 001 mfd.
Potentiometers:
    R201_______________ 500, 000 ohms.
    R202_______________ 25, 000 ohms.
    R205, R208, R229____ 10, 000 ohms.
    R215_______________ 500 ohms.
    R222_______________ 50, 000 ohms.
    R225_______________ 1, 000 ohms.
    R226_______________ 250, 000 ohms.

Resistors:

| | |
|---|---|
| R203 and R224 | 22,000 ohms. |
| R204 | 1,000. |
| R206 | 12,000. |
| R207 and R227 | 6,800. |
| R209 and R210 | 1.02 meg. |
| R211 | 3,300 ohms. |
| R212, R214, R218, R219 and R220 | 0.51 meg. |
| R213 | 0.1 meg. |
| R216 | 220 ohms. |
| R217 | 39,000 ohms. |
| R221 | 1.3 meg. |
| R223 | 470 ohms. |
| R228 | 1.0 meg. |
| R230 | 8,200 ohms. |
| R231 | 1,200 ohms. |
| R232 | 1,200 ohms. |
| R233 | 1,200 ohms. |
| R234 | 1,200 ohms. |
| R235 | 5,100 ohms. |
| R236 | 5,100 ohms. |
| R237 | 220,000 ohms. |
| R238 | 220,000 ohms. |
| R239 | 220,000 ohms. |
| R240 | 220,000 ohms. |
| R241 | 1,000 ohms. |

The first step in the operation of a mill which is controlled by apparatus in accordance with the present invention is to determine empirically the values of the power input signal and the production signal, for optimum efficiency of the mill under given conditions. This can be done by operating the mill with a normal run of the material to be ground and by making a recording of the power input signal current from the current transformer 122 and the production signal voltage from the photoelectric apparatus 124 (see Figs. 1 and 2).

As an example, for the embodiment of the invention described above, let us assume that a reference voltage of 100 volts is applied to the bridge by adjustment of the potentiometer R208. For this value of reference voltage the potentiometer R205 which controls the power input signal is set so that a voltage of 100 volts is produced across the condenser C202 when the predetermined optimum operating value of current is being drawn by the mill motor 111. It is desirable to adjust the production signal in such a manner that when optimum conditions exist the value of the signal across R203 is zero and the sum of the production signal and power input signal therefore equal the power input signal. The reason for doing this is that, provided the mill can produce product as fast as it is fed, it will be desirable to feed the mill at a rate which will maintain the power input to the mill motor at its full operating value. If the rate of production of the mill should increase, the voltage across C201 will increase, the grid of tube V202 will become more negative, but as this tube was already biased to a cut off condition (zero current through V202 and R203) no change will be made to the error signal applied to V203. Control of the rate of material will be by the power input signal alone. However if the rate of production of the mill decreases, the voltage across C201 will decrease, the grid of tube V202 will become less negative (or positive), current will flow through tube V202 and R203, tending to reduce the feed rate of material. In this example, control of the rate of material is by rate of production and motor power input. Thus, arranging the value of the production signal as above set forth insures that if the power drawn by the motor exceeds its normal operating value, the rate of feed is immediately reduced to prevent possible overloading of the motor until once again the motor is operating at normal value. On the other hand, it will be appreciated that with this arrangement any decrease in the amount of product produced will give the production signal a positive value which when it is added to the power input signal increases the sum of the two signals to a value greater than the reference signal calling for a decrease in feed rate to prevent overloading the mill. The potentiometers R201 and R202 are adjusted so that the voltage across the resistor R203 is zero when the predetermined maximum production rate for the mill has been reached. As explained above, the sense of variation of the voltage across the resistor R203 is such that a decrease in the rate of production of the mill results in an increase in the voltage across the resistor R203. The voltage across the condenser C202, and the voltage across the resistor R203 are in series, and it is their sum which the bridge circuit compares to the reference voltage. The output voltage of the bridge which appears at the junction of the resistors R209, R210 and voltage line 236 is equal to one-half the difference between the reference voltage and the sum of the voltages appearing across the condenser C202 and the resistor R203.

The output voltage of the bridge circuit is amplified by the two-stage amplifier (130, Fig. 1) comprising the tubes V203 and V204, which controls the value of the D. C. flowing through the D. C. windings of the saturable reactors SR201 and SR202. The connections through the amplifier are such that changes in the output voltages of the bridge in a positive direction decreases the current in the D. C. windings of the saturable reactors, while a decrease in the output voltage of the bridge circuit increases the current flowing in the D. C. windings of the saturable reactors. The D. C. flowing in the saturable reactors controls the amount of phase shift of the voltage appearing at the grids of thyratrons V206, V207, V208 and V209, and, as is well known, this phase shift of voltage at the grids of the thyratrons controls the amount of power supplied through their anode circuits. If the D. C. through the saturable reactors decreases, the rate of feed of material to the mill as determined by the feed control units 118 and 119 will decrease, and conversely, if the D. C. through the saturable reactors increases, the material feed rate will increase.

The following is the operational sequence for the complete circuit shown in Figure 2 assuming that the reference voltage (129, Fig. 1) has been adjusted to a value corresponding to optimum efficiency of the mill, and that the current to the mill motor 111 and the rate of production of the mill as indicated by 124 are normal. Under these conditions the voltage of the signal supplied from the bridge circuit (126, Fig. 1) to the input of the amplifier circuit (130, Fig. 1) will be very close to zero value, and the mill feed rate as determined by the feed control units 118 and 119 will be at the most efficient point.

1. Assuming that the rate of production of the mill has decreased, possibly due to a harder material being fed to the mill:

(a) The half-cycle current pulses from the photoelectric apparatus 124 will decrease in value.

(b) The voltage across the condenser C201 will decrease.

(c) The bucking voltage from the potentiometer R202 will make the voltage at the grid of the tube V202 positive.

(d) The voltage across the resistor R203 will increase, making the cathode of the tube V202 more positive.

(e) The positive voltage to the resistor R210 will become more positive.

(f) The grid-cathode voltage of the tube V203 will become less negative.

(g) The grid-cathode voltage of the tube V204 will become more negative.

(h) The D. C. through the D. C. windings of the saturable reactors SR201 and SR202 will decrease.

(i) The currents through the thyratron tubes V206, V207, V208 and V209 will decrease.

(*j*) The rate of feed of material to the mill 110 (Figure 1) will decrease to a new operating value such that the sum of the power input signal and the production signal is substantially equal to the reference voltage at the bridge circuit.

2. Assuming that the load on the mill motor 111 has increased beyond normal and consequently the current through the current transformer 122 has increased:

(*a*) The voltage across the condenser C202 will increase.

(*b*) The positive voltage supplied to the resistor R210 will increase.

(*c*) The grid-cathode voltage of the tube V203 will become less negative.

(*d*) The grid-cathode voltage of the tube V204 will become more negative.

(*e*) The D. C. through the D. C. windings of the saturable reactors SR201 and SR202 will decrease.

(*f*) The current supplied to the feed control units 118 and 119 by the thyratron tubes V206, V207, V208 and V209 will decrease.

(*g*) The rate of feed of material to the mill 110 (Figure 1) will decrease to a new value at which the sum of the power input signal and the production signal at the bridge circuit is substantially equal to the reference voltage at the bridge circuit.

3. If the reference voltage at the bridge circuit is decreased, the mill feed rate will be reduced to a new operating value at which the sum of the power input signal and the production signal at the bridge circuit equals the reference voltage at the bridge circuit.

4. Conversely to the conditions described under 1, 2 and 3, above, if the current supplied to the mill motor decreases or if the reference voltage at the bridge circuit increases, the rate of feed of material to the mill 110 will be increased to a new value to suit the new operating conditions.

Manually operable controls are provided for fixing the minimum and maximum rates of feed of material to the mill as well as to fix the feed ratio between the feed control units 118 and 119 which control, respectively, the feeding of coarse material and fine material to the mill. This may be desirable, for instance, in a ball mill where efficiency may depend to some extent upon maintaining a so-called "seasoned" charge relating to the proportions of various particle sizes present to the proportions present in the mill of the various sizes of reduction media, or in the case of reduction mills wherein the charge acts as its own reduction medium, to insure that there are always sufficient large particles of feed material present to provide for efficient crushing as taught, for instance, in my copending application Serial No. 203,861, filed January 2, 1951. In addition, if the mill is of the type described in my previously mentioned Patent 2,704,636, it may be desirable to adjust the ratio of coarse to fine in the feed to insure the production of the maximum "keying" effect. In many cases, however, the ratio of coarse to fine in the feed may be determined prior to the arrival of the feed in the delivery bins, and if that is the case the feed may be provided from a single feeder, for instance, in the manner described in my above-mentioned application 203,861.

In that case, the apparatus described will be modified so that control means for one feeder only are provided and the need for adjustment means for the feed ratio as part of the feed control apparatus is eliminated.

The potentiometer R226 sets the minimum rate of feed by setting the value of the current which will flow through the D. C. windings of the saturable reactors SR201 and SR202 even though the tube V204 is non-conducting. Under the conditions in which the signals from the mill call for a large reduction in the rate of feed of material to the mill, the tube V204 becomes non-conducting and the rate of feed of the material to the mill depends upon the setting of the potentiometer R226. The setting of the potentiometer R229 controls the maximum rate of feed of material to the mill so that the signals from the mill can not produce a rate of feed which might overload the mill. The setting of the potentiometer R229 controls the operation of the tube V205. As the grid of the tube V205 is made less negative the anode to cathode voltage of the tube is decreased. Normally the cathode of the tube V205 is held more positive than its grid to allow little or no current to flow through the tube. However, as the anode of the tube V204 becomes less positive, the cathode of the tube V205 reaches zero voltage with respect to its grid, or may even become negative with respect to its grid. Current will flow through the tube V205 to the tube V204 rather than through the D. C. windings of the saturable reactors SR201 and SR202 and the tube V204. In this manner the maximum value of the D. C. in the D. C. windings of the saturable reactors SR201 and SR202 is established.

It will be appreciated from the foregoing that the present invention provides a means of automatically controlling the feed to a material reduction mill in a manner which provides for the maintenance of optimum efficiency. It will be further appreciated that any variation in the rate of production of the mill will immediately be compensated for by a variation in the rate of feed and the fact that the size of the correction in rate of feed is in every case proportional to the amount of variation in the rate of production and/or power consumption insures rapid adjustment to meet new conditions or variations in existing conditions within the mill. The result is that the charge within the mill drum has no opportunity to build up or diminish to an extent where the efficiency of the reduction action of the mill is appreciably affected.

Although the utilization of the signal inversely functional to the rate of production of the mill is generally desirable and in many cases essential, there are certain instances where satisfactory control of the feeders may be accomplished on the basis of a signal functional to power input to the mill motor by itself. For instance, if the feed material is of highly uniform character as regards hardness and the size distribution is reasonably uniform, it will be appreciated that when optimum conditions in the mill have been reached the rate of production of the mill will remain constant for constant feed conditions, and the power input signal will operate to maintain the feed rate at a constant value corresponding to the predetermined desirable power input.

In addition, however, there are certain types of mill wherein the efficiency of the reduction action is high over an appreciable range of charge volumes. This is true in the case of ball mills. In mills of the type described in my prior Patent No. 2,555,171 and my Patent No. 2,704,636, the efficiency of the reduction action is very little affected with variation in charge volume provided the charge is kept within the range of from about 25% to about 29% of the mill volume and the crushing action of the mill has been enhanced by the addition of a charge of inertia bodies in accordance with the teachings of my copending application Serial No. 234,782, filed July 2, 1951, now Patent No. 2,680,568, and its continuation-in-part of application Serial No. 407,761, now Patent No. 2,680,570.

It will be apparent that where the efficiency of the reduction action remains relatively constant, the power input will be a function of the charge volume. Accordingly, once the power input of the mill motor for optimum efficiency of the mill for a particular feed material has been determined, the power input signal by itself can be compared to the reference signal to provide the necessary control of the feed rate. In using the power input signal alone, there will be a certain tendency of the device to "hunt," but since in cases where the feed is reasonably uniform this "hunting" will all take place within the range of charge volumes giving high efficiency of reduction, this tendency can be neglected since it has an effect on overall efficiency which is practically negligible.

Having regard to the foregoing, therefore, it should be understood that this invention, in its broadest aspect contemplates operation on the basis of comparison of a power input signal only to a reference signal, and control of the feed rate in accordance with the sense and direction of the difference signal thus produced. Such operation is contemplated however, only in the limited circumstances set forth above.

*Second embodiment*

The main difference between the two embodiments is that here a sound level signal is substituted for the light intensity signal (124, Fig. 1) of the first embodiment. I have found the light intensity signal satisfactory for small mills but I also found that in large mills the volume of material passing through the outlet duct (120) is so great as to make difficult the projection of the light signal across the duct.

Figure 7:
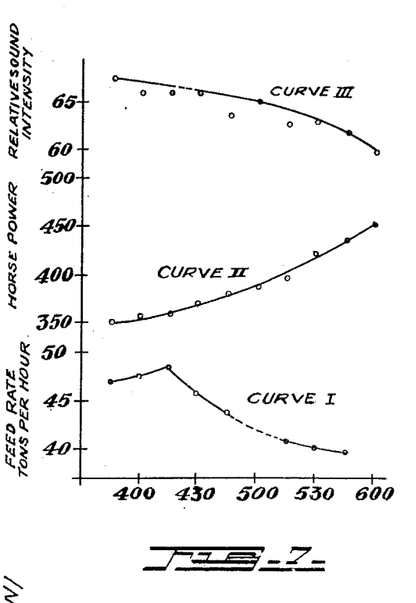
Figs. 7-9 are curves illustrating the functioning of the second embodiment, Fig. 7 relating feed rate tons per hour, horsepower and sound intensity to time, Fig. 8 feed rate or mill output tons per hour to horsepower, and Fig. 9 feed rate or mill output tons per hour to sound intensity.
Figure 8:
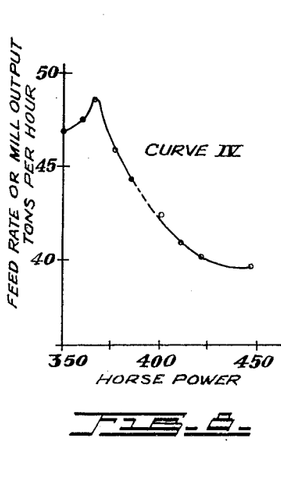

The motor signal (via 122) is the same; i. e., a D. C. voltage proportional to motor power or horsepower. This voltage increases with horsepower. Decrease in this voltage indicates a drop in horsepower, whereupon the feed rate will be increased until the horsepower is re-established at the correct operating level. The relationship between horsepower and feed rate is illustrated in Figs. 7 and 8. Fig. 8 illustrates that the relationship is not linear and that there is a critical point beyond which an increase in horsepower produces a decrease in feed rate. Therefore, the feed rate curve is ambiguous because it is not known from observation whether the control is operating on the low load or overload side of the curve. Accordingly, it is necessary to provide a "back up" signal to indicate on which side of the curve the control is operating.

Figure 9:
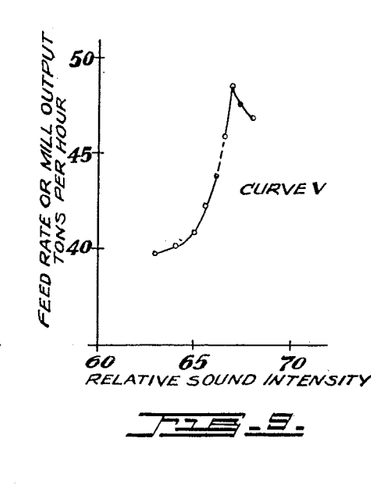

This "back up" signal is a sound level signal which is produced from the sound of the mill, and is greatest at low mill loads. The sound will diminish as the mill load increases and at the start of the overload condition the sound will rapidly diminish (curve V, Figure 9). Thus, the sound signal indicates the size of the charge within the mill. If, however, one thinks of the mill as operating at any given moment under predetermined optimum conditions of efficiency and the charge begins to build up, then the sound intensity will drop indicating that the mill is producing faster than the feeding rate. Therefore, a decrease in sound intensity will indicate an increase in the rate of production, and vice versa.

This holds true despite the fact that if one plots (curve V, Figure 9) sound intensity level against rate of production (determined by measuring the material fed to the mill under conditions of equilibrium over a wide range of mill motor horsepower) the rate of production will be found to increase as sound intensity falls off until a point is reached where rate of production is a maximum. After this, both rate of production and sound intensity will decrease.

Thus, it may be said that the sound signal is only inversely functional to rate of production for a given value of motor horsepower, whereby at any given value of motor horsepower a decrease in the sound level indicates an increase in rate of production. It is, therefore, only when the motor or power signal and the sound signal are considered together that the sound signal bears a definite functional relationship to and therefore can be used to indicate the magnitude of the rate of production. When in the first embodiment the light signal and the power signal are integrated then, regardless of the horsepower at any given moment, the light signal always reflects the amount of material withdrawn from the mill.

To obtain a clear signal from the sounds produced inside the mill, it is necessary to differentiate between ambient noise and milling sound. This demands a filter that passes and integrates the higher frequency sounds.

The motor signal and sound level signal must be weighted so that for a motor signal decrease and a sound increase, the motor signal predominates. For a motor signal decrease and a sound decrease, the sound level indicator signal must predominate to indicate that the mill is overloaded and in a "flywheel" condition.

The equipment consists of a suitable sound responsive device such as a permanent magnet loudspeaker functioning as a dynamic microphone (Figure 4), an impedance matching microphone transformer T402, a three stage resistance-capacitance coupled amplifier, a germanium diode rectifier, a single stage direct coupled amplifier and an indicating microammeter.

Figure 3:
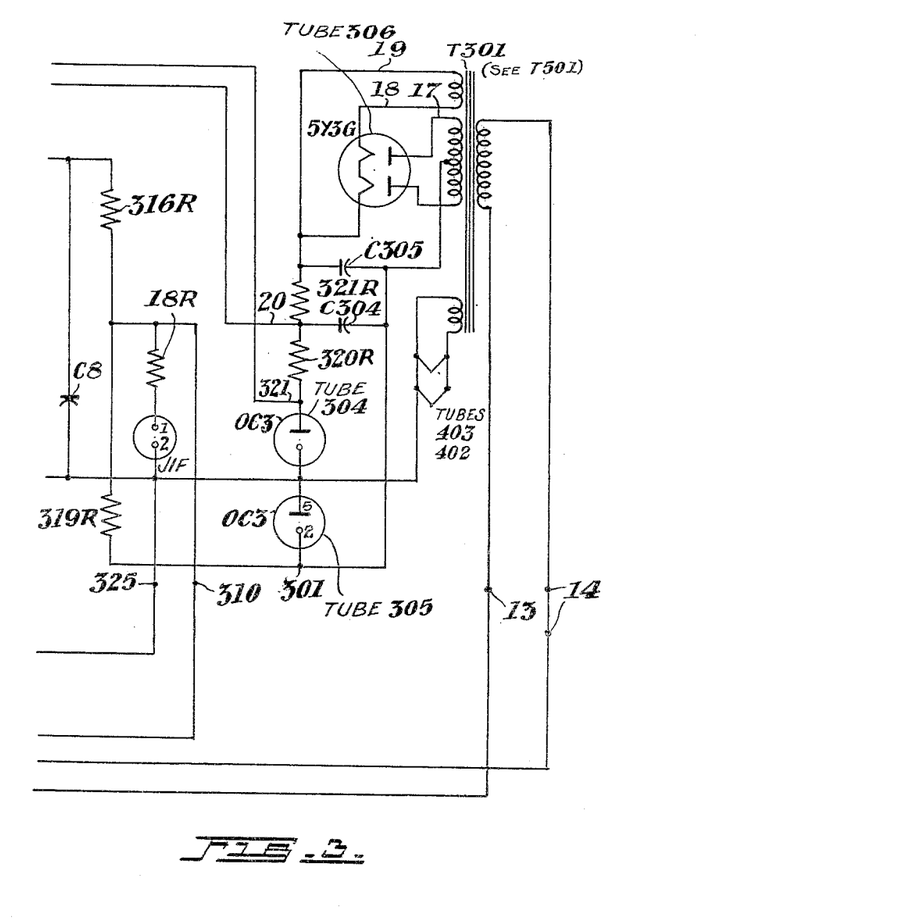
Figs. 3 and 4, when placed side-by-side, represent the circuit diagram of the second and preferred embodiment.
Figure 4:
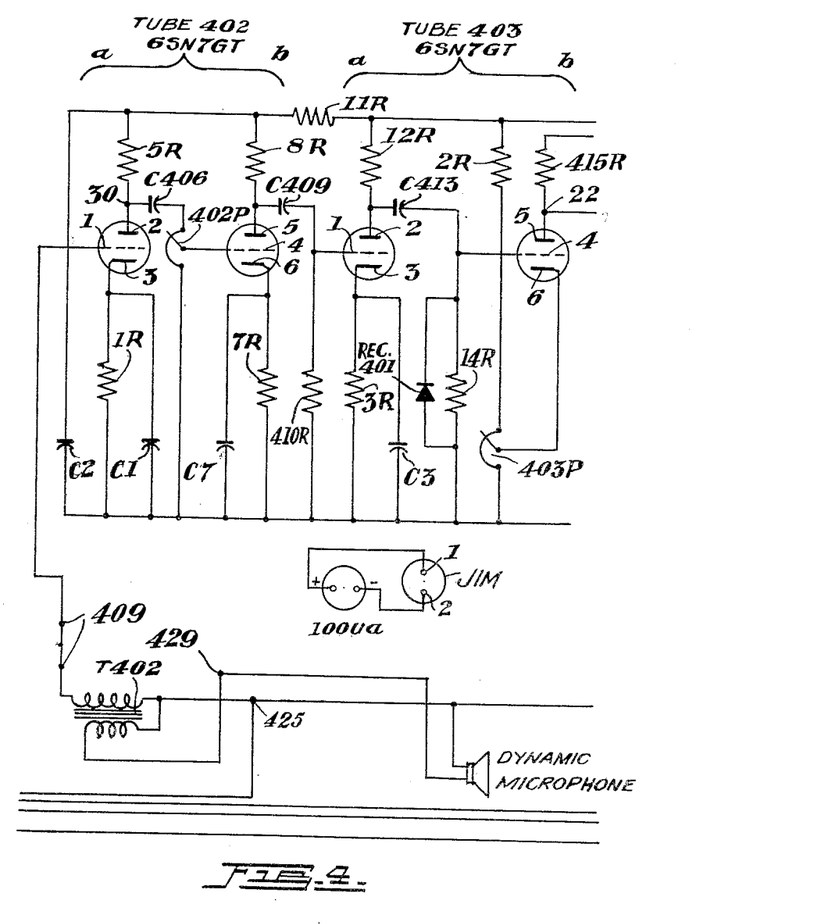

Tubes 402a, 402b and 403a, 403b are two 6SN7GT radiotrons. Tubes 304 and 305 are OC3/VR105 regulators, and tube 306 is a 5Y3G full wave rectifier.

The microphone should be placed under the mill drum, centrally between the bearings and on the side away from the drive motor. Preferably, the microphone should point toward the centre of the ore load. The microphone wires 425 and 429 should be run in grounded conduit or armoured cable to minimize hum pick-up and afford mechanical protection.

Transformer T301 is excited from 115 volts, 60 cycle, and supplies heater voltage to tubes 402 and 403, and filament and high voltage to tube 306.

The D. C. output of tube 306 is filtered by condenser C305, resistor R321, and condenser C304, applied through current limiting resistor R320 to the regulator tubes 304 and 305. The midpoint of tubes 304 and 305 is connected to ground, making wire 321, 105 volts positive and wire 301, 105 volts negative.

The voltage output of the dynamic microphone is stepped up by transformer T402 and applied between grid and ground of tube 402a. Tube 402a amplifies this voltage and applies it, through the high pass filter consisting of condenser C406 and potentiometer P402, to grid and ground of tube 402b. This tube amplifies the signal still more and passes it through filter composed of condenser C409 and resistor R410 to tube 403a.

The amplified signal from 403a is fed through condenser C413 to the grid of tube 403b and the germanium diode Rec401 which is so poled that the greater the sound the more positive the voltage between grid of 403b and ground. This positive grid voltage is the integration of all the higher frequency sounds and tends to increase the current flowing through tube 403b. The cathode of tube 403b may be adjusted by potentiometer 403P to a voltage that is positive above ground. This positive cathode voltage decreases the current flowing through tube 403b.

Resistors R415, R316, and R319 and tube 403b form a voltage network such that when 403b plate current is low, the voltage between conductors 310 and 325 is low. As 403b plate current rises conductor 310 becomes more positive. At low sound levels the positive cathode voltage exceeds the positive grid voltage, and the output voltage on conductors 310—325 is high. At loud sound levels, the positive grid voltage exceeds the positive cathode voltage and the output voltage at 310—325 is low.

The output voltage, 325 to 310 is applied to the ore feed amplifier and the thyratron amplifier (Figures 5 and 6) corresponding to the lower right hand part of Figure 2 of the first embodiment. An increase in sound increases the ore feed slightly; a decrease in sound greatly decreases the ore feed.

The microammeter JIF reads D. C. output voltage 100 ma.=50 volts approximately. The instrument reading varies inversely with the sound.

Figure 5:
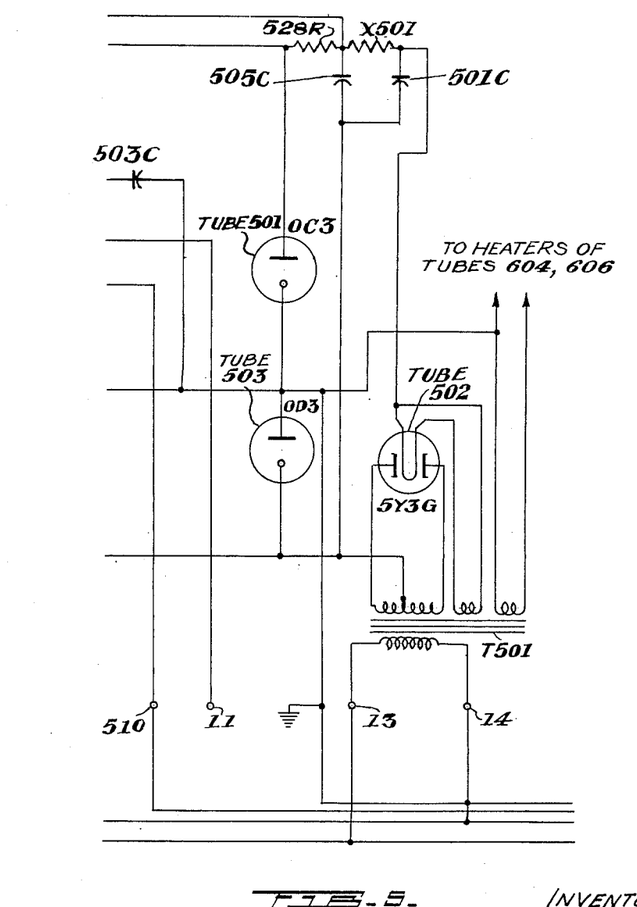
Figs. 5 and 6 when placed side-by-side represent the circuit diagram of the ore feed amplifier connected with Figs. 3 and 4.
Figure 6:
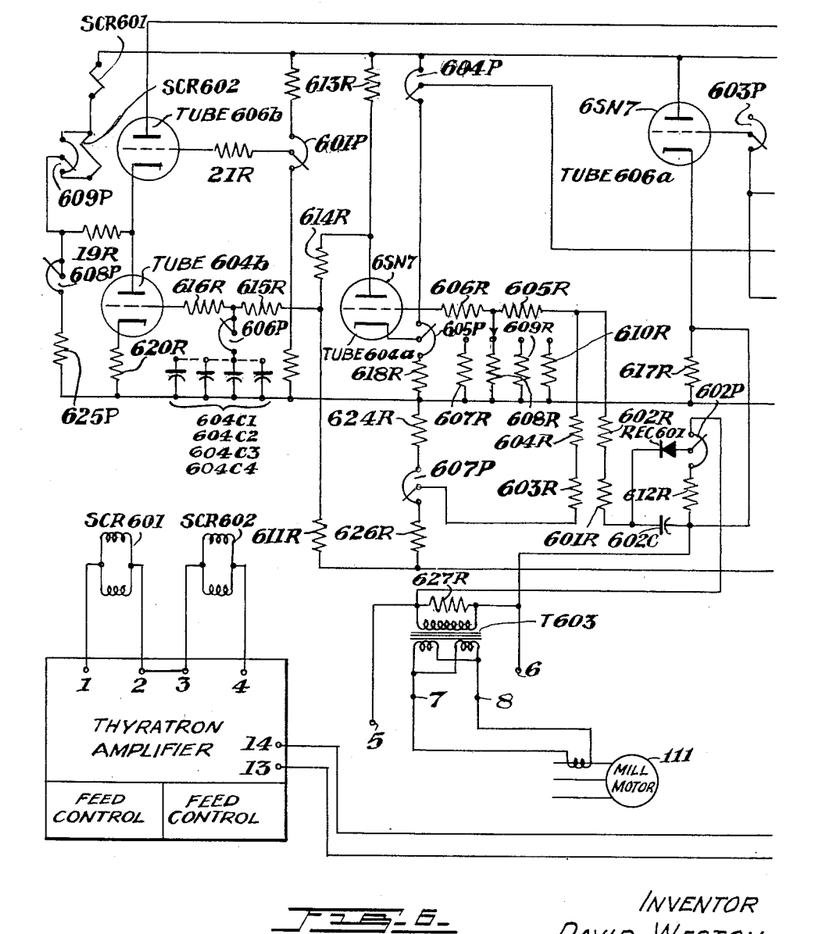

The control system to maintain the ore feed rate at the level that ensures maximum mill efficiency is diagrammatically illustrated in Figures 5 and 6. It is arranged automatically to increase or decrease the feed magnet average power, this increasing or decreasing the ore feed rate. The amplitude of the sound signal is controlled by a potentiometer 603P (Fig. 6) coupled in the grid circuit of feed amplifier 606A. The sensitivity is controlled by potentiometer 602P coupled in the cathode circuit of tube 606a (Fig. 6) and is adjusted at the chosen operating load to give the desired sound level indicator signal. The operating sequence is:

1. Set potentiometer 402P to 0.
2. Adjust potentiometer 403P to give an instrument reading of 100 (50 volts).
3. Lock 403P dial.
4. Adjust 402P to give an instrument reading of 30 (15 volts) when mill loading is at the chosen operating point.
5. Lock 402P dial.

The ore feed amplifier accepts signals from the mill motor (motor signal) and a signal from sound level indicator (Figures 3 and 4). The two signals are totalized and referred to a manually adjustable reference voltage. The resultant voltage difference (error signal) is amplified and applied to the input of the thyratron amplifier as a phase shifted voltage, the amount of the phase shift being proportional to the magnitude and direction of the error signal.

The thyratron amplifier converts this phase shifted error signal into power, which, when applied to the feed magnet coils, will control the ore feed rate.

The direction and magnitude of the input signals is such that if ore conditions change to give:

1. an increase in horsepower, then the motor signal becomes more positive and the feed rate decreases; or
2. a decrease in horsepower, then the motor signal becomes less positive and the feed rate increases; or
3. a decrease in sound intensity, then the sound level signal becomes more positive and the feed rate decreases; or
4. an increase in sound intensity, then the sound level signal becomes less positive and the feed rate increases.

When operating the mill at a chosen horsepower lower than the critical mill overload point, conditions 1 and 3 occur simultaneously for an ore load increase, and conditions 2 and 4 occur simultaneously for an ore load decrease. When operating the mill at the critical mill overload point the sound level predominates and will have the largest control effect.

The equipment (Figs. 5 and 6) consists of a self-contained regulated power supply, a two stage direct coupled amplifier, a rectifier to convert the A. C. motor current to a D. C. motor signal, a reference voltage and controls to select minimum feed, feed ratio and maximum feed.

Referring now to Figures 5 and 6, which may be placed side by side, the transformer T501 (Fig. 5) corresponding to T301, excited from 115 volts, 60 cycle, supplies heater power to tubes 604 and 606 (Fig. 6) and filament and high voltage to tube 502. The D. C. output of tube 502 is filtered by condenser 501c, choke X501, and condenser 505c, and applied through the current limiting resistor 528R to the voltage regulator tubes 501 and 503.

The midpoint of tubes 501 and 503 is connected to ground. The plate of tube 501 is 105 volts positive above ground. The cathode of tube 503 is 105 volts negative below ground.

The sound level signal from output conductor 510 of the sound level indicator is applied to the grid of tube 606a which is grounded via condenser 503C. This tube produces a voltage across cathode resistor 617R almost equal to the sound level signal. The purpose of this tube is to produce the 617R voltage without drawing appreciable current from the sound level signal.

The motor signal is taken from the current flowing in any one phase of the balanced three phase supply to the wound rotor motor 111 driving the mill. The primary of transformer T603 is connected in series with the measuring instruments and current transformer. The ratio of T603 is 46/1.5 amperes flowing in the primary which will produce a current flow through resistor 627R of .108 ampere, which produces a voltage of 108 volts R. M. S.

A portion of this voltage is applied to condenser 602C through rectifier Rec601. Potentiometer 602P is adjusted until 100% motor current will develop a D. C. voltage of 100 volts across capacitor 602C.

The reference voltage is the voltage between the 0 or grounded bus and the arm of potentiometer 607P. This voltage is adjustable between approximately −50 and −125 volts.

The error signal is the difference between the reference voltage and the sum of the motor signal and the sound level signal (617R).

The motor signal (602c) in series with the sound level signal (617R) form one arm of a bridge network. The reference voltage is a second arm of the bridge. 601R, 602R, 603R and 604R form the remaining 2 bridge arms.

The resistance arms being equal, the bridge will be balanced only if the sum of the sound level and motor signals, (617R) (602C), equals the reference voltage. If the sound level and motor signal voltages are greater than the reference voltage, then the bridge output will be positive (measured between 0 bus and the junction of 602R, 604R and 605R). If the reference voltage is greater than the motor and sound level signals, then the bridge output voltage is negative.

The bridge output voltage, called the error signal, is equal to half the difference existing between the voltage arms of the bridge network.

The error signal is applied to the amplifier input through the desensitizing network consisting of resistors 605R, 606R and selected ones of resistors 607R, 608R, 609R or 610R. 607R gives least sensitivity and 610R the greatest sensitivity. For an error signal of zero volts, the cathode of tube 604a is made sufficiently positive by means of potentiometer 603P to operate this tube in the centre of its operating characteristic; that is, its plate voltage will be around 50 volts positive. This plate voltage will be reduced by the 614R voltage and the 611R voltage, to produce a small negative voltage on the grid of tube 604b. This 604b negative voltage will be of the magnitude necessary to allow a plate current flow through the SCR's of approximately .5 milliampere.

When a negative error voltage is applied to the amplifier input, the grid of tube 604a will become more negative, its plate current through 613R will decrease and 604a plate voltage will become more positive. The grid of tube 604b will become less negative (more positive) and the SCR current will increase. With a positive error signal applied to the amplifier, the SCR current will decrease.

Resistors 606R and 616R are current limiting resistors for the tubes 604a and 604b respectively used to limit grid current to a safe value under abnormal conditions. Resistor 618R ensures a minimum tube 604a cathode voltage. Tube 604b cathode resistor 629R improves the stability of the amplifier by introducing degeneration.

The network 615R, 606P and 604C forms a time delay circuit that delays and averages the effect of signal voltage changes.

Tube 604b converts the amplified error signal into two SCR signals. These SCR signals, when applied to the thyratron amplifier, will determine the ore feed rate. It is desirable to obtain a higher feed rate from SCR601 than from SCR602 and this is controlled by a potentiometer 609P.

Minimum feed control potentiometer 608P will allow current flow through SCR601 and SCR602 even though tube 604b is non-conducting. If the error signal calls for a large reduction in ore feed, tube 604b will stop conducting, and without potentiometer 608P and resistor 625R the ore feed would almost completely stop. By adjustment of 608P a minimum ore feed rate will be established.

It is also desirable to put a "ceiling" on the feed rates, so that the amplifier cannot force the feed rates higher than the value that avoids overloading the mill. This maximum feed rate is determined by potentiometer 601P.

As the grid of tube 604b is made less negative the plate to cathode voltage of 604b is decreased. Normally, the cathode of tube 606b is held more positive than its grid, allowing little or no current flow through 606b. However, as the plate of 604b becomes less positive the cathode of tube 606b will become zero or even negative with respect to its grid. Current will then flow through tube 606b to tube 604b rather than through SCR601, SCR602 to tube 604b. This then establishes a maximum value of SCR601, SCR602 current. This maximum current point is adjusted by potentiometer 601P. The adjustment of potentiometer 601P, to control maximum feed may be made by visually observing the feed rate of the fine feeder, at a time when the electronic control is calling for maximum feed. If desired, the current flowing through the fine feed coils may be used as an indication of feed rate. An ammeter can be used for this measurement.

This control puts a "ceiling" on the feed rate. The electronic control can only reduce the feed below this "ceiling" and cannot feed at a rate exceeding this "ceiling." A dial setting of 0 will allow the control to feed at the highest possible feed rate.

The motor signal potentiometer 602P is adjusted until a sensitive D. C. voltmeter indicates a voltage across 602C of 100 volts when the motor current is 100% of full load.

It may be adjusted at less than full load if the voltmeter reading is made equal to $$\frac{\text{Reduced motor current}}{\text{Full load motor current}} \times 100 \text{ volts}$$

The bias control potentiometer 605P of tube 604a determines the operating point of tubes 604a and 604b, and should be adjusted until a sensitive voltmeter (5,000 to 20,000 ohms per volt) connected between plate of 604a and ground (not shown) indicates a voltage of approximately 50 volts.

The minimum feed potentiometer 608P determines the minimum feed rate. The electronic control cannot reduce the feed rate below this selected minimum feed. This control is adjusted by visually observing the ore feed of the fine feeder, at a time when the electronic control is calling for minimum feed.

The setting of feed ratio potentiometer 609P reduces the current flow through SCR602 as compared to SCR601. This decreases the current through the coarse feeder coil as compared to the fine feeder coil; the coils not being shown. This control may be adjusted by visually observing the ore feed. This control will adjust only for feed coil current ratios. If chains are added to one of the feed bins, the potentiometer 609P will not maintain the same feed ratio. The feed ratio is determined by the 609P setting, the ore bin chains and the physical properties of the ore bins.

The thyratron amplifier corresponds to the one employed in the first embodiment, each thyratron supplying half cycle pulses, or less, to a feed magnet coil (not shown, but used at 118 or 119 Fig. 1). A resistor network, in conjunction with the saturable core reactors SCR601, SCR602 located in the ore feed amplifier, supply a phase shifted voltage to control the firing of the thyratrons. The function of the amplifier is to convert the amplified error signal appearing in the D. C. windings of SCR601 and SCR602, into power that can be applied to the feed magnet coils.

Tests conducted with the control of the second embodiment indicate its effectiveness. When the mill was deliberately overloaded by shutting off the sound level control, the resultant increase in the power signal called for an increase in feed. However, an increase in feed under these conditions diminished the output of the mill until it filled up with material and became in effect a gigantic flywheel, with the mill under observation which normally produces about 43 tons an hour, called for feed at about 100 tons an hour. The overloading was continued until the mill motor was drawing about 515 horsepower, or about 50% above the rated horsepower. When the sound level control equipment was reconnected, the feed was immediately reduced to practically nothing. Within 45 seconds the horsepower load on the mill motor had dropped by about 10 horsepower, and in about 15 minutes optimum conditions were established in that the motor was drawing its normal 360 horsepower and the mill was producing at the rate of about 43 tons an hour.

This test is graphicallly illustrated by the three curves of Figure 7.

While I have disclosed the best embodiments of my invention of which I am now aware, it will be obvious to those skilled in the art that many modifications and improvements are possible without departing from the spirit of the invention as defined in the claims. For instance, the vibrations of the mill may be transmitted to the sound level indicator by other means than the diaphragm of a microphone to produce an electrical signal representing the efficiency or magnitude of the charge in the mill.

I claim:

1. In the automatic control of a motor driven material reduction mill, the method which comprises producing a first electrical signal varying with the reduction characteristics of the material in said mill, producing a second electrical signal varying with power input to the mill, algebraically combining said electrical signals, comparing said combined signals to a reference signal to obtain a difference signal, and varying the functioning of the mill in accordance with the sense and magnitude of said difference signal.

2. The method according to claim 1, characterized in that the first electrical signal varies directly with the size of the charge in the mill, and in which the difference signal is used to vary the rate of material supplied to the mill.

3. The method according to claim 1, characterized in that the first electrical signal is derived from vibrations emanating from the mill.

4. The method according to claim 3, characterized in that the first electrical signal diminishes in intensity as the charge in the mill builds up.

5. The method according to claim 3, characterized in that the first electrical signal is derived from higher frequency components of the mill vibration.

6. In the automatic control of an electric motor driven material reduction mill containing a charge of material, said electric motor being connected to a source of electrical power, the method which comprises continuously producing a first electrical signal varying inversely with the size of the charge in the mill, continuously producing a second electrical signal varying with the power input to the driving mill motor, electrically integrating said signals, comparing the integrated signals to an electrical reference signal related to a desired operation of the mill to obtain an electrical difference signal, and varying the rate of supply of material to the mill in accordance with the sense and magnitude of said difference signal.

7. Automatic control apparatus for the feeding of a charge material to a reduction mill comprising first means for producing a first electrical signal which varies substantially inversely with the size of the charge in the mill, second means for producing a second electrical signal which varies with the power input to said mill, means for algebraically comparing the combined signals to a given predetermined electrical signal related to desired operating conditions in the mill to produce a difference signal, a variable feed supply means for said mill, and means responsive to said difference signal for varying the rate of feed in accordance with the sense and magnitude of said difference signal.

8. The apparatus according to claim 7, characterized in that the means for producing the first electrical signal is a device which responds to vibrations in the mill.

9. The apparatus according to claim 8, characterized in that said means for producing a first electrical signal comprises an electrical circuit which includes a microphone.

10. The apparatus according to claim 9, characterized in that the output of said microphone circuit is connected to the input of an amplifier circuit, and further characterized in that said amplifier circuit has a high pass filter for eliminating low frequency vibrations.

11. The apparatus according to claim 10, characterized in that a rectifier is connected to the output circuit of said amplifier and is so poled that its output increases with the vibration intensity.

12. Automatic control apparatus for the feeding of a material reduction mill comprising means including a microphone for producing a first electrical signal varying substantially inversely with the size of the charge in the mill, means for producing a second electrical signal varying with the power input to said mill, an amplifier having an input circuit connected to said microphone, a high pass filter coupled to the output of said amplifier adapted to select a predetermined range of frequencies derived from said first signal, a rectifier coupled to the output of said amplifier and responsive to said selected range of frequencies to produce a positive output energy corresponding in intensity with said selected range, a comparator circuit adapted to combine algebraically two signals and compare them to a reference signal, means for applying said first signal to said comparator circuit, means for applying said second signal to said comparator circuit, means for producing a reference signal coupled to said comparator circuit whereby said comparator circuit produces a difference signal corresponding to the difference between the algebraic sum of the first and second signals and said reference signal, variable feed supply means for said mill, and means responsive to the sense and magnitude of said difference signal for varying the rate of feed to the mill.

13. Automatic control apparatus as defined in claim 12, characterized in that the means for producing the second signal comprises a current transformer coupled to a power lead to an electric motor which drives the mill.

14. Automatic control apparatus as defined in claim 13, characterized in that all of said electrical signals are D.-C. voltage impulses and the means for comparing said signal comprises a bridge circuit.

15. Automatic control apparatus as defined in claim 14, characterized in that an amplifier is coupled to the output of said bridge circuit for amplifying the difference signal, and further characterized by means coupling the output of said amplifier to means responsive to said difference signal for varying the rate at which said feed supply means feeds said mill.

16. Automatic control apparatus as defined in claim 15, comprising means to predetermine the minimum and maximum rates at which said feed supply means can feed said mill.

17. In the automatic control of a material reduction mill, the method which comprises; continuously producing an electric signal which varies substantially inversely with the rate of production of said mill; continuously producing a similar electric signal which varies with power input to the mill; comparing the sum of said signals to a similar reference signal empirically determined as the value of said signal for optimum efficiency whereby to obtain a difference signal; and varying the rate of supply of feed material to said mill in accordance with the sense and magnitude of said difference signal.

18. In the automatic control of a material reduction mill of the type wherein product is withdrawn from the mill in a current of air, the method which comprises; continuously producing an electric signal which varies substantially inversely with the rate of production of said mill; continuously producing a similar electric signal which varies with power input to said mill; comparing the sum of said signals to a similar reference signal empirically determined as the value of said signals for optimum efficiency whereby to obtain a difference signal; and varying the rate of supply of feed material to said mill in accordance with the sense and magnitude of said difference signal.

19. Automatic control apparatus for the feeding of material reduction mills comprising; means for producing an electric signal which varies with power input to a mill; means for producing a similar electric signal which varies substantially inversely with the rate of production of said mill; means for comparing the algebraic sum of said signals to a given predetermined similar electric signal to produce a difference signal; feed supply means for said mill; and means for varying the rate at which said feed supply means feeds said mill in accordance with the sense and magnitude of said difference signal.

20. Automatic control apparatus for the feeding of material reduction mills of the type wherein product is withdrawn in a current of air comprising; means for producing an electric signal which varies with power input to a mill; means for producing a similar electric signal which varies substantially inversely with the rate of production of said mill; means for comparing the algebraic sum of said signals to a given predetermined similar electric signal to produce a difference signal; feed supply means for said mill; and means for varying the rate at which said feed supply means feeds said mill in accordance with the sense and magnitude of said difference signal.

21. Auotmatic control apparatus as defined in claim 20, wherein the means for producing an electric signal which varies inversely with the rate of production of said mill comprises a light source arranged to direct a beam of light across a conduit through which product is conveyed from said mill in an airstream; a photoelectric cell arranged to receive the beam of light produced by said light source and produce an electric signal substantially proportional in magnitude to the amount of light received; and means for converting said signal into a signal which can be added to the signal which varies with power input to the mill.

22. Automatic control apparatus as defined in claim 21, in which said means for providing a signal which varies with power input to the mill comprises a current transformer arranged in a power lead to an electric motor which drives the mill.

23. Automatic control apparatus as defined in claim 22, in which all said electric signals are D. C. voltages and the means for comparing the sum of said signals varying with power input to said mill and inversely varying with the rate of production of said mill to a predetermined similar signal comprises a bridge circuit arranged to produce an output signal functional to the difference between said sum and said predetermined signal.

24. Automatic control apparatus as defined in claim 23, comprising an amplifier connected to amplify the output signal of said bridge circuit and to supply the amplified output signal to said means for varying the rate at which said feed supply means feeds said mill.

25. Automatic control apparatus as defined in claim 24, comprising means to predetermine the minimum and maximum rates at which feed supply means can feed said mill.

26. Automatic control apparatus as defined in claim 24, in which said feed supply means comprises one or more units, the rate of feed of each unit being variable according to variations in the amount of A. C. power available to said unit, the power to said unit being supplied through at least one thyratron type discharge tube having a control grid; an A. C. power source of the same phase as the power supplied to said unit for supplying an A. C. control voltage to the grid of said thyratron tube; and saturable reactor means connected to shift the phase of the voltage supplied to the grid of said thyratron tube from said A. C. power source in accordance with variations in the output signal of said amplifier thereby to control the amount of A. C. power available to said unit.

27. Automatic control apparatus as defined in claim 26, in which said feed supply means comprises two units, one for feeding coarse material and one for feeding fine material, the relative rates of feed of said units being predetermined by presetting the relative amounts of the output signal of said amplifier applied to the saturable reactor for each said unit.

28. In the automatic control of a material reduction drum-type mill the method which comprises; continuously producing an electric signal which varies with power input to said mill; continuously producing a similar reference signal empirically determined as the value of said signal for optimum efficiency of said mill under given conditions, comparing said signal to said empirically determined reference signal whereby to obtain a difference signal, and varying in a continuous manner the rate of feed to said mill in accordance with the sense and magnitude of said difference signal.

29. The method defined in claim 28, wherein said signal which varies with power input is a D. C. voltage produced by rectifying means connected to the secondary windings of a transformer of which the primary windings are connected in a power lead to an electric motor driving said mill.

30. In the automatic control of a material reduction drum-type mill having a high efficiency of reduction over an appreciable range of charge volumes the method which comprises; continuously producing an electric signal which varies with power input to said mill; continuously producing a similar reference signal empirically determined as the value of said signal for optimum efficiency of said mill under given conditions, comparing said signal to said empirically determined reference signal whereby to obtain a difference signal; and varying in a continuous manner the rate of feed to said mill in accordance with the sense and magnitude of said difference signal.

31. Automatic control apparatus for the feeding of material reduction drum-type mills comprising; means including a current transformer arranged in a power lead to an electric motor which drives said mill for producing an electric signal varying with power input to said mill, means for producing a similar reference signal of predetermined value, means for algebraically comparing said signals arranged to produce an output signal which varies in accordance with the difference between said reference signal and the signal varying with the power input, feed supply means including two units, one for feeding coarse material and one for feeding fine material, and means for varying in a continuous manner the relative feed rates of said units based on relative amounts of the output signal applied to each of said units.

32. Automatic control apparatus as defined in claim 31, characterized in that said comparing means comprises a bridge circuit arranged to produce said output signal and an amplifier connected to amplify the output signal of said bridge circuit and to supply the amplified output signal to said means for varying in a continuous manner the rate at which the two feed units feed said mill.

33. Automatic control apparatus as defined in claim 32, in which the rate of feed of each feed unit is varied in accordance with the variations in the amount of A. C. power available to said unit, the power to each of said units being supplied through a thyratron type discharge tube having a control grid, an A. C. power source, of the same phase as the power supplied to each of said units for supplying an A. C. control voltage to the grid of said thyratron tube, and saturable reactor means connected to shift the phase of the voltage supplied to the grid of said thyratron tube from said A. C. power source in accordance with variations in the output signal of said amplifier thereby to control the amount of A. C. power available to said unit.

34. Automatic control apparatus as defined in claim 33, comprising means to predetermine the minimum and maximum rates at which said feed supply means can feed said mill.

References Cited in the file of this patent

UNITED STATES PATENTS

| | | |
|---|---|---|
| 2,175,009 | Anderson | Oct. 3, 1939 |
| 2,235,928 | Hardinge | Mar. 25, 1941 |
| 2,240,822 | Adams | May 6, 1941 |
| 2,244,826 | Hurley | June 10, 1941 |
| 2,381,351 | Hardinge | Aug. 7, 1945 |
| 2,446,046 | Hurley | July 27, 1948 |
| 2,491,466 | Adams | Dec. 20, 1949 |
| 2,556,653 | Kelso | June 12, 1951 |
| 2,570,288 | Todd | Oct. 9, 1951 |